United States Patent [19]

Miller et al.

[11] Patent Number: 4,893,474

[45] Date of Patent: Jan. 16, 1990

[54] TURBOCHARGER WITH DUAL FUNCTION ACTUATOR

[75] Inventors: Charles D. Miller, Long Beach; Marian Janik, San Pedro; Richard S. Tomoyasu, Torrance, all of Calif.

[73] Assignee: Allied-Signal Inc., Morristown, N.J.

[21] Appl. No.: 223,302

[22] Filed: Jul. 25, 1988

[51] Int. Cl.[4] ............................................. F02B 37/12
[52] U.S. Cl. .................................................. 60/602
[58] Field of Search ................... 60/600, 601, 602, 603

[56] References Cited

U.S. PATENT DOCUMENTS 1,816,787  7/1931  Moss ...................................... 60/602
4,658,586  4/1987  Iwasa ..................................... 60/602

Primary Examiner—Michael Koczo
Attorney, Agent, or Firm—Ken C. Decker; William N. Antonis

[57] ABSTRACT

An exhaust gas driven turbocharger is provided with a single pneumatic actuator which controls both a pivoting vane which varies the flow area or aspect ratio of the exhaust gas inlet passage to the turbine, and also controls the wastegate valve. A linkage mechanism including a preloaded spring and a bellcrank lever actuates levers controlling the wastegate valve and the pivoting vane.

18 Claims, 4 Drawing Sheets

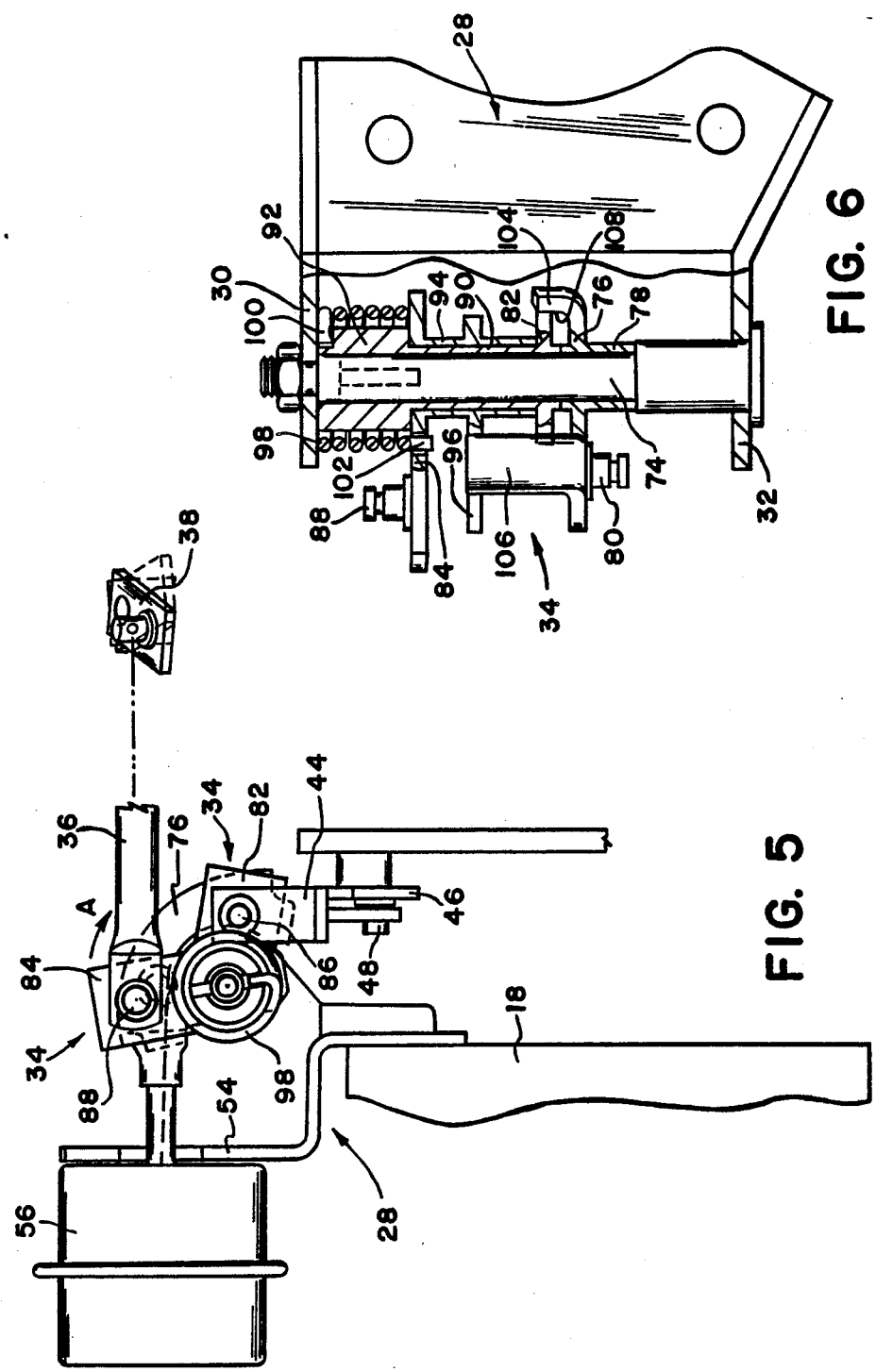

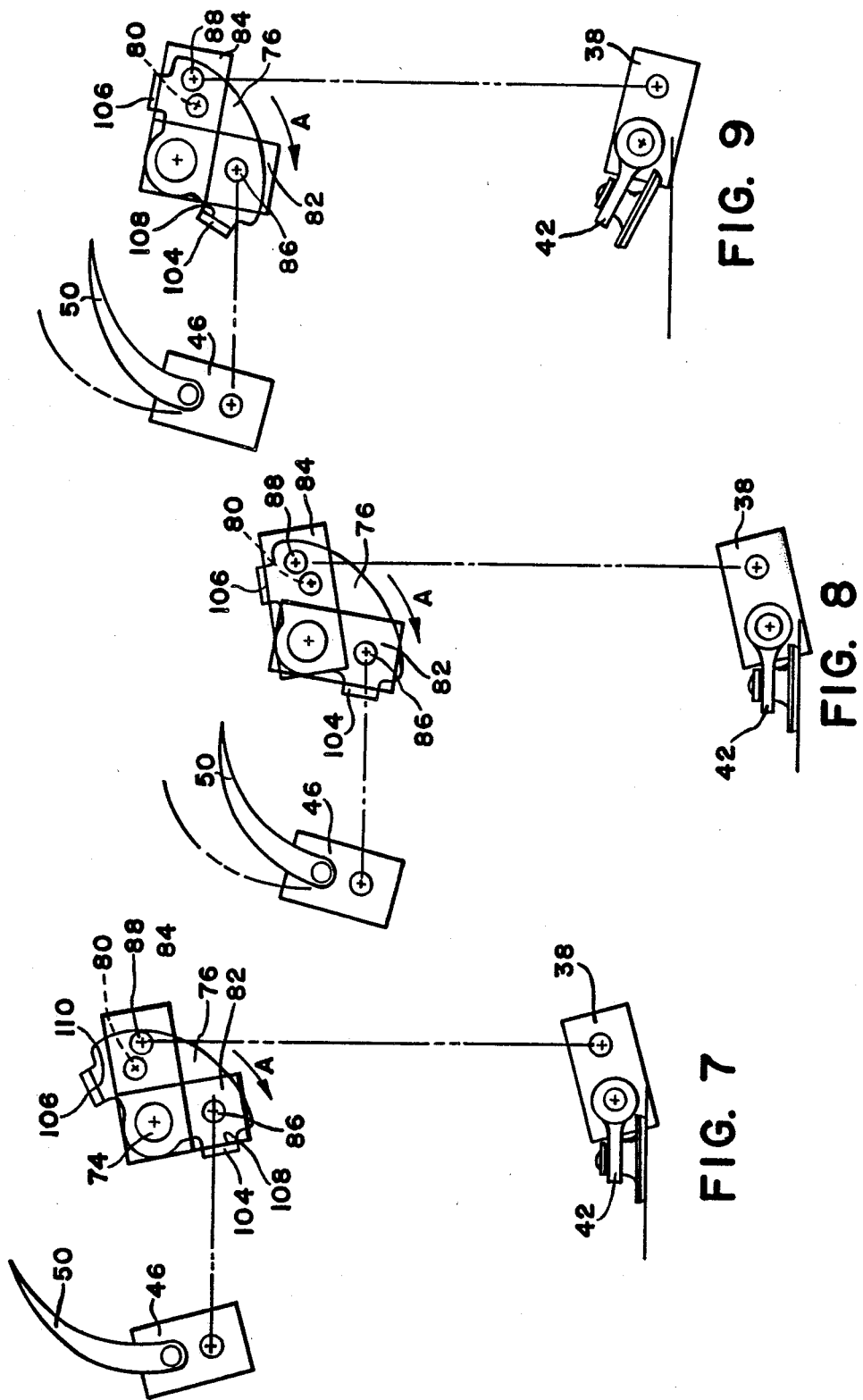

TURBOCHARGER WITH DUAL FUNCTION ACTUATOR

This invention relates to an exhaust gas driven turbocharger in which a single pneumatic actuator actuates both the wastegate valve and a pivoting vane that varies the flow area of the turbine inlet passage.

Exhaust gas driven turbochargers convert energy wasted in the engine exhaust gases to drive a compressor which compresses inlet air to charge the air intake system of the engine, thereby increasing available engine power. One problem with exhaust gas driven turbochargers used on automotive vehicles is the problem of "turbo lag", that is, the lag between the time that the vehicle is accelerated from idle and sufficient pressure is developed by the turbocharger compressor to effect an appreciable increase in engine power. One way of reducing turbo lag is to vary the flow area of the turbine inlet passage. In this way, exhaust gases at low flow are accelerated through the reduced passage, thereby providing the necessary power to quickly accelerate the turbine wheel. As the quantity of the exhaust gases increases, the flow area of the turbine inlet passage is increased to permit the inlet swirl energy volume of exhaust gas to generate the appropriate power to compress the necessary quantity of inlet air.

It has already been proposed to provide a pivoting vane in the inlet passage of the turbine which is initially in a position providing only a very small cross-sectional area, but which is pivoted as a function of the increase in pressure generated by the compressor to a fully opened position providing maximum flow through the turbine inlet passage. Actuation of the vane has in the past been provided by a conventional pneumatic actuator which is connected to the outlet passage of the compressor and thus actuates the vane as a function of the pressure level developed in the compressor. This type of turbocharger also requires a wastegate valve to vent the exhaust passages to prevent overboost when flow of exhaust gases becomes excessive. The wastegate is actuated only at relatively high compressor discharge pressures, that is, pressures greater than those required to actuate the pivoting vane to its fully opened position. Accordingly, prior art turbochargers in which pivoting vanes were used also required a second pneumatic cannister to actuate the wastegate valve. This cannister was also connected to the outlet passage of the compressor. The two pneumatic cannisters used to actuate the pivoting vane and the wastegate valve each had to be independently calibrated and adjusted. Since both cannisters are relatively large, it became difficult or impossible to fit this type of turbocharger into the relatively crowded underhood space of a modern automotive vehicle.

The present invention replaces the dual pneumatic actuators required in such prior art turbochargers with a single pneumatic actuator. The pneumatic actuator actuates a sequencing and control mechanism that sequentially operates the pivoting vane and the wastegate valve. Accordingly, a more compact turbocharger is provided, which may be more easily accommodated on a vehicle engine, and only a single pneumatic actuator need be assembled and adjusted.

These and other advantages of the present invention will become apparent from the following description, with reference to the accompanying drawings, in which:

FIG. 5 is a schematic illustration of the interconnections between the linkages of the actuator mechanisms for the pivoting vane and wastegate for the turbocharger illustrated in FIG. 1;

FIG. 6 is a cross-sectional view taken substantially along lines 6—6 of FIG. 1; and FIG. 7, FIG. 8, and FIG. 9 are schematic illustrations illustrating the relative positions of the various components of the actuating mechanism for controlling the pivoting vane and wastegate valve in various operating positions.

Figure 1:
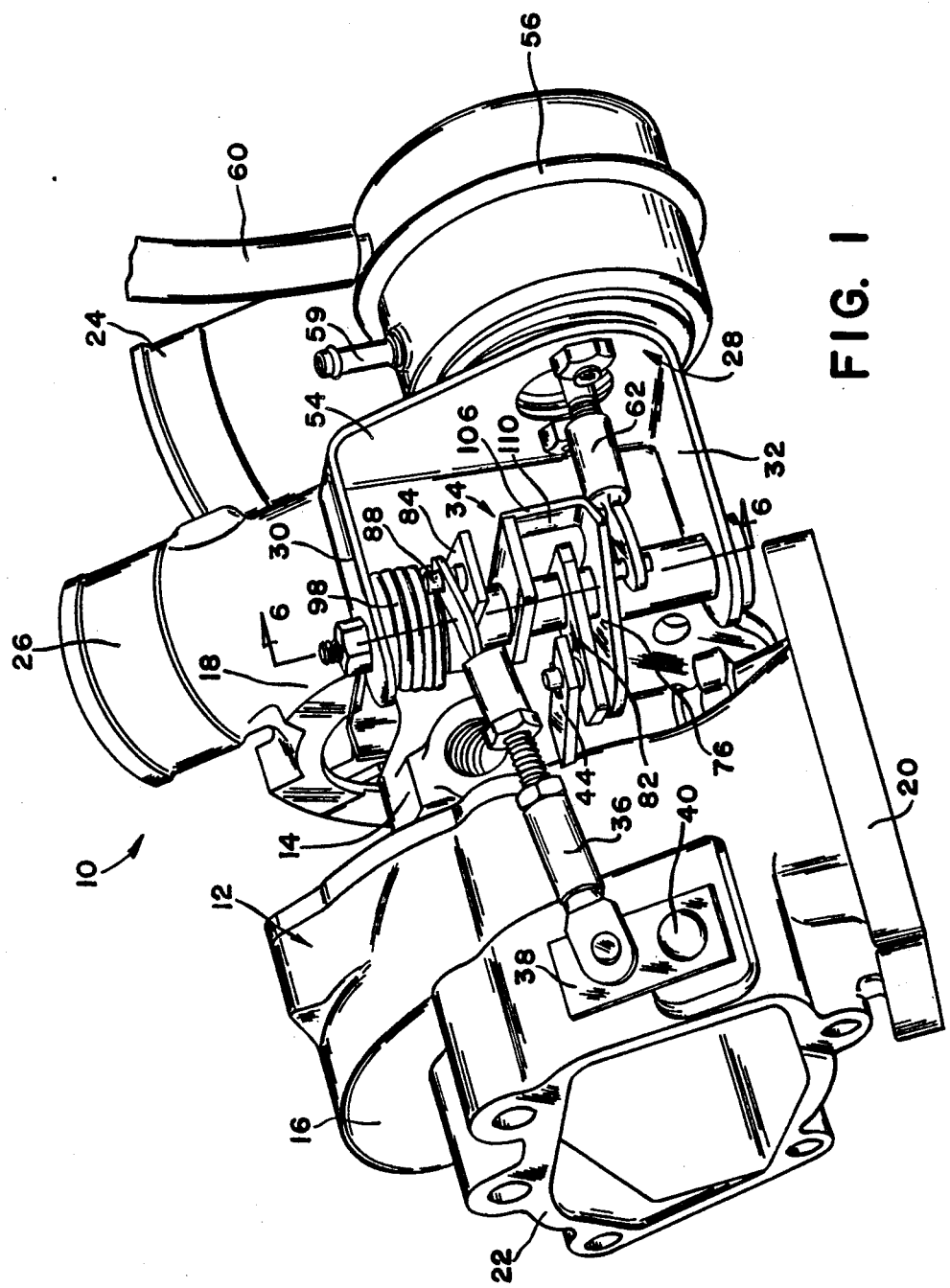
FIG. 1 is a perspective view of an exhaust gas driven turbocharger made pursuant to the teachings of the present invention.

Referring now to the drawings, an exhaust driven turbocharger generally indicated by the numeral 10 includes a housing generally indicated by the numeral 12. Housing 12 includes a center housing portion 14, a turbine housing portion 16, and a compressor housing portion 18. Turbine housing portion 16 includes an exhaust gas inlet 20 which is connected to the exhaust manifold of the vehicle engine, and an exhaust outlet 22, which is connected with the engine exhaust system. The compressor housing portion 18 is provided with an ambient air inlet 24 and a compressed air outlet 26. The compressed air outlet 26 is connected with the air induction system of the vehicle, and the ambient air inlet 24 is connected to an appropriate filter (not shown).

Figure 4:
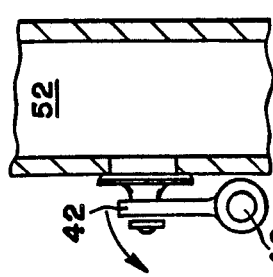
FIG. 4 is a fragmentary cross-sectional view taken substantially along lines 4—4 of FIG. 3.

A mounting bracket 28 is secured to the compressor housing portion 18. Mounting bracket 28 includes upper and lower arms 30, 32 which mount a linkage assembly generally indicated by the numeral 34, which will be described in detail hereinafter. The linkage assembly 34 includes a lever 36 connecting with an actuating tang 38 which rotates a shaft 40 upon which a pivoting wastegate valve 42 (FIGS. 3 and 4) is mounted. Linkage assembly 34 further includes a second lever 44 which connects the linkage assembly 34 with a tang 46 (FIG. 3) which rotates a shaft 48 which actuates a vane 50 which is pivotal within the exhaust gas inlet passage 52. Operation of the vane 50 will be described in detail later herein.

Figure 2:
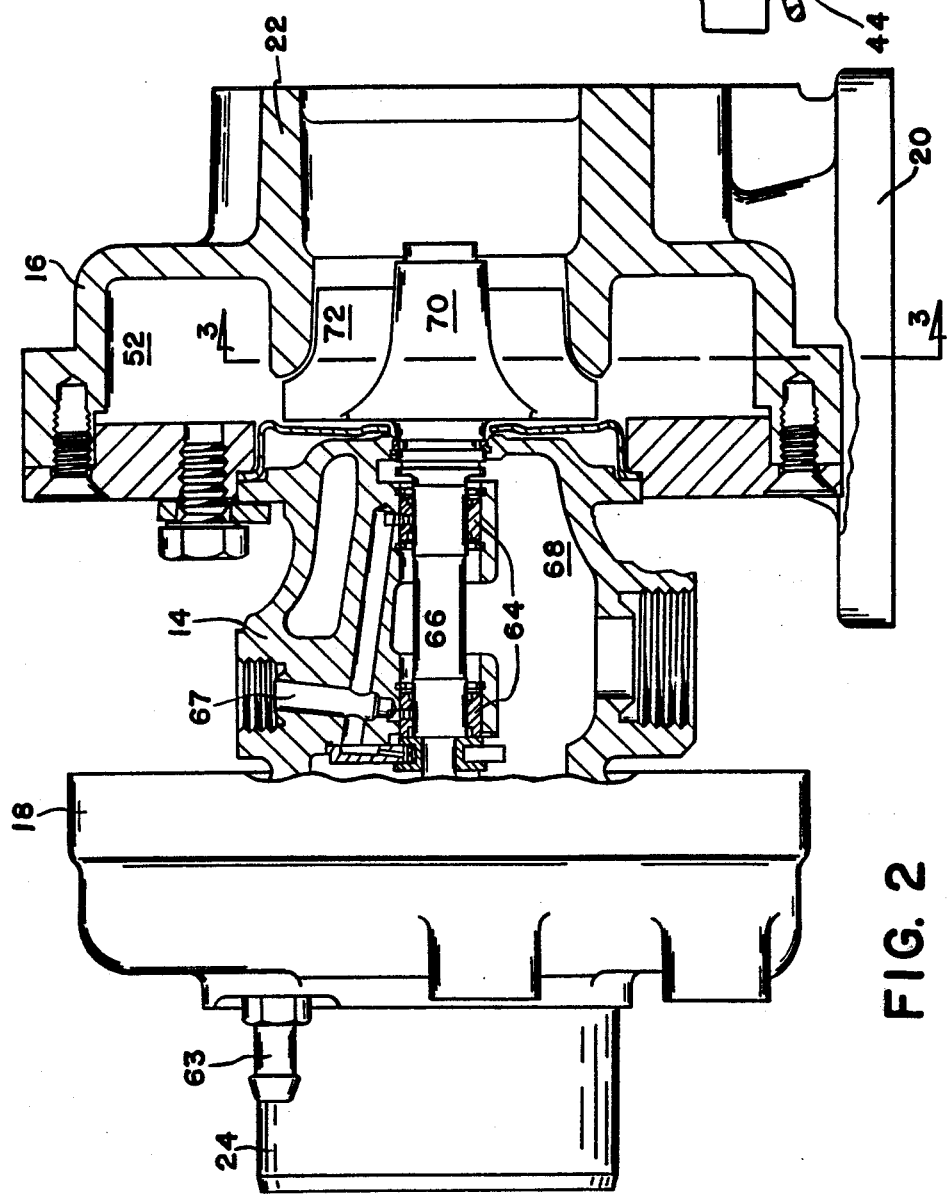
FIG. 2 is a longitudinal cross-sectional view of the center housing and turbine housing of the turbocharger illustrated in FIG. 1.

The mounting bracket 28 further includes a lateral arm 54 which interconnects upper and lower arms 30, 32. A conventional pneumatic cannister 56 is mounted on the lateral arm 54. Pneumatic cannister 56 is conventional, and will not be described in detail herein. Mounted within the cannister 56 is a diaphragm (not shown) which divides the cannister 56 into an atmospheric chamber which is communicated to atmosphere through a port 59, and a pressure chamber, which is communicated to the outlet of the compressor housing portion 18 by a pressure line 60. The pressure line 60 connects with the port 63 on compressor housing portion 18 (FIG. 2). The diaphragm operates an output member 62, which connects the diaphragm with the linkage assembly 34. A small return spring (not shown) mounted within the cannister 56 urges the diaphragm, and therefore the output member 62, away from the arm 54 of bracket 28. Accordingly, the output member 62 will be moved toward the turbine housing portion 16 as a result of increasing pressure levels in the compressor outlet passage, but will be urged away from the turbine housing portion 16 in response to reducing pressure levels in the compressor outlet passage.

Referring now to FIG. 2, the center housing portion 14 supports bearings 64 which rotatably mount a shaft 66. Lubrication passages 67 and an oil sump 68 provide communication of a lubricating oil to the bearings 64. A turbine wheel 70 is mounted on one end of the shaft 66 within the turbine housing portion 16, and a compressor wheel of conventional design (not shown) is mounted on the opposite end of the shaft 66 in the compressor housing portion 18. Exhaust gases are communicated through the turbine inlet passage 52, pass through blades 72 supported on the turbine wheel 70, and are discharged through the outlet 22.

Referring now to FIGS. 5 and 6, the linkage assembly 34 includes a spindle 74 which extends between arms 30, 32 of the bracket 28. A bellcrank lever 76 is rotatably mounted on the spindle 74 through an axially extending barrel 78. A pivot 80 projects from the bellcrank lever 76 for connection with the output member 62 of the pneumatic cannister 56. The linkage assembly 34 includes sequencing means comprising the bellcrank lever 76, a vane actuation tongue 82, and a wastegate valve actuation tongue 84. The vane actuation tongue 82 carries pivot 86 (FIG. 5) for connection of the tongue 82 to vane actuating lever 44. The wastegate valve actuating tongue 84 carries a pivot 88 for connection with the wastegate valve actuating lever 36. The vane actuating tongue 82 projects from a barrel 90 which rotatably engages the spindle 74 and terminates adjacent the arm 30 of bracket 28 in a radially enlarged portion 92. The wastegate valve actuating tongue 84 projects from a barrel 94 which is coaxial with the barrel 90 and rotatably supported thereby. A lever arm 96 also projects from the barrel 94.

Linkage assembly 34 further includes control means comprising a preloaded coil spring 98. One end 100 of the coil spring engages an aperture in the radially enlarged portion 92 of the barrel 90 upon which the vane actuating tongue 82 is mounted. The other end 102 of the preloaded coiled spring 98 engages a corresponding aperture in the wastegate valve actuating tongue 84. Accordingly, due to its preload, the spring 98 biases the tongues 82 and 84 to predetermined positions relative to one another. The control means further includes axially extending tongues 104, 106 which project from the bellcrank lever 76. Tongue 104 defines an engagement surface 108 which engages the edge of the tongue 82, and the tongue 106 defines an engagement surface 110 (FIG. 1) which engages the surface of the lever arm 96. Due to the preload of the spring 98, the tongue 82 will be yieldably biased into engagement with the surface 108.

Figure 3:
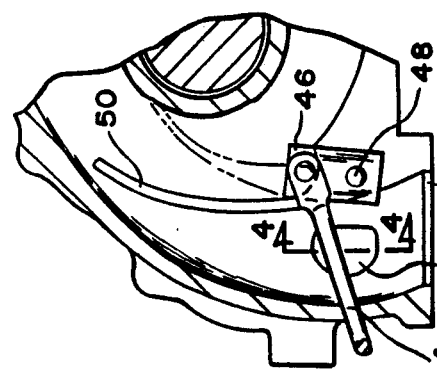
FIG. 3 is a fragmentary cross-sectional view taken substantially along lines 3—3 of FIG. 2.

In operation, and referring particularly to FIGS. 7, 8 and 9 of the drawings, FIG. 7 illustrates the components in their positions at engine idle in which the vane 50 is disposed in the position illustrated in the solid lines in FIG. 3 in which the vane 50 minimizes the flow area through the exhaust gas inlet passage 52 in order to accelerate the gases into the turbine wheel 70. In this position, the output member 62 of the pneumatic cannister 56 is biased into its fully retracted position as illustrated in the drawings by the return spring (not shown) housed within the cannister 56. In this condition, the preloaded spring 98 maintains the vane actuating tongue 82 in engagement with the engagement surface 108 of axially extending tongue 104 of the bellcrank lever 76. The spring 98, due to the fact that it is connected to both the tongue 82 and tongue 84 which is connected to operate the waste-gate valve 42, also biases the wastegate valve 42 in its closed position.

As the pressure generated by the compressor increases, the pneumatic actuator 56 actuates the output member 62 thereof to the left viewing FIG. 1, thereby cranking the bellcrank lever 76 in the direction indicated by the arrow A in FIGS. 5, 7, 8 and 9. As the bellcrank lever is cranked, the spring 98 maintains the tongue 82 against the engagement surface 108 because of the preload of the spring 98. Accordingly, as the bellcrank lever is cranked, the spring 98 rotates the tongue 82, thereby actuating the vane 50 from the position illustrated in the solid lines in FIG. 3 to the fully open position illustrated by the phantom lines in FIG. 3. Although the preload of the spring 98 is progressively reduced as the bellcrank lever 76 is cranked, the preload of the spring is at all times sufficient to maintain sufficient bias on the tongue 84 to maintain the wastegate valve closed and to maintain sufficient bias on the tongue 82 to maintain the latter in engagement with the engagement surface of 108.

FIG. 8 illustrates the position of the bellcrank lever 76 in the position in which the tongue 50 is fully open, that is, when the tongue 50 assumes the position illustrated in phantom in FIG. 3. Although the tongue 106 is shown in engagement with the tongue 84, it will sometimes be desirable to provide a "deadband" between the time that the vane 50 is fully actuated and before the wastegate is actuated. Accordingly, it is within the scope of the invention to provide a clearance between the tongue 106 and the tongue 84 when the vane 50 is fully actuated. Regardless of whether or not such a deadband is provided, further rotation of the bellcrank lever 76 will engage the tongue 106 with the tongue 84. When this occurs, additional pressure in the pneumatic cannister 56 will urge the output member 62 away from the intermediate position illustrated in FIG. 8 in which the vane 50 is fully actuated. When this occurs additional movement of the output member 62 will cause the bellcrank lever 76 to rotate the tongue 84. Rotation of the tongue 84 is transmitted to the tang 38 through the lever 36. As illustrated in FIG. 9, further rotation of the bellcrank lever 76 causes the rotating tongue 84 to open the wastegate valve 42. At the same time, the engagement surface 108 is moved away from the tongue 82, since the tongue 82 is already at its position maintaining the valve 50 fully opened. The preload of the spring 98 holds the tongue 82 in the position illustrated in FIGS. 8 and 9, even though the engagement surface 108 on the bellcrank lever is moved away from the edge of the tongue 82. The preload on the spring 98 is minimized in the position illustrated in FIG. 8, since the preload is progressively reduced as the bellcrank lever 76 is rotated from the position illustrated in FIG. 7 to the position illustrated in FIG. 8.

During rotation between the FIG. 7 and FIG. 8 positions, as discussed hereinabove, the spring 98 maintains the tongue 82 in engagement with the tongue 84, but as the bellcrank lever 76 is cranked between the FIG. 8 and FIG. 9 positions, the preload on spring 98 will again be increased since, as illustrated in FIG. 6, the spring 98 is connected to both of the tongues 82 and 84. As the bellcrank lever 76 is cranked between the FIG. 8 and FIG. 9 positions, the preload on the spring 98 will again be increased, since the tongue 82 will remain stationary due to the fact that the vane 50 is in the fully opened position and the fact that the tongue 84 is rotated relative to the tongue 82. Accordingly, when the pressure in the cannister 56 is reduced, the return spring (not shown) within the cannister and the preload spring 98 will return the various components to their initial position, it being noted that the preload spring will maintain the tongue 84 in engagement with the tongue 106 on the bell- crank lever 76 as the latter is rotated in the direction opposite to the direction indicated A and that the tongue 104 will subsequently engage the tongue 82 to rotate it back to its initial position.

We claim:

1. An exhaust gas driven turbocharger comprising a housing, a shaft rotatably mounted in said housing, a turbine wheel and a compressor wheel mounted in said housing on said shaft for rotation therewith, said housing defining a turbine inlet passage and a compressor inlet passage for communicating exhaust gas to said turbine wheel and ambient air to said compressor wheel respectively and further defining a turbine outlet passage and a compressor outlet passage for communicating exhaust gas and compressed air respectively from said housing a wastegate valve for venting said turbine inlet passage, a flow are control means for varying the flow area of said turbine inlet passage and actuable from a minimum flow area position to a maximum flow area position, a single pneumatic actuator responsive to the pressure level in said compressor outlet passage for sequentially operating both said flow area control means and said wastegate valve, said pneumatic actuator including an output member progressively actuated from a retracted to an extended position in response to successively increasing pressure levels in said compressor outlet passage, and linkage means connecting said output member to both said flow area control means and said wastegate valve, said linkage means including a bellcrank lever pivotally mounted on said housing for rotation about and axis and connected to said output member for rotation thereby as said output member is moved from said retracted to said extended positions, first lever means for operating said flow control means and second lever means for operating said wastegate valve, and control means interconnecting the bellcrank lever with each of said first and second lever means.

2. An exhaust gas driven turbocharger as claimed in claim 1, wherein said control means includes spring means, said first and second lever means include cooperating members controlled by said spring means.

3. An exhaust gas driven turbocharger as claimed in claim 1, wherein said control means includes preloaded spring means acting between said first and second lever means for urging the latter to predetermined positions relative to each other and relative to said bellcrank lever, said bellcrank lever including engaging means for engaging each of said first and second lever means.

4. An exhaust gas driven turbocharger as claimed in claim 3, wherein said first lever means includes a first tang mounted for rotation about said axis and said second lever means includes a second tang mounted for rotation about said axis, said preloaded spring means yieldably urging said tangs to predetermined angular positions relative to one another, said engaging means releasably connecting each of said tangs with the bell-crank lever for rotation thereby.

5. An exhaust gas driven turbocharger as claimed in claim 4, wherein said engaging means includes a first engaging member for engaging said first tang, said resilient means maintaining said first member in engagement with the bellcrank lever as the output member is moved from said retracted position to said first intermediate position.

6. An exhaust gas driven turbocharger as claimed in claim 5, wherein said engaging means includes a second engaging member for engaging said second tang when the output member is moved to said second intermediate position.

7. An exhaust gas drive turbocharger as claimed in claim 6, wherein said flow control means is a vane pivotally mounted in said turbine inlet passage, said first lever means including a member interconnecting said first tang with said vane for pivoting the latter.

8. An exhaust gas driven turbocharger for an engine capable of acceleration from an engine idle condition comprising a housing, a shaft rotatably mounted in said housing, a turbine wheel and a compressor wheel mounted in said housing on said shaft for rotation therewith, said housing defining a turbine inlet passage and a compressor inlet passage for communicating exhaust gas to said turbine wheel and ambient air to said compressor wheel respectively and further defining a turbine outlet passage and a compressor outlet passage for communicating exhaust gas and compressed air respectively from said housing, a wastegate valve for venting said turbine inlet passage, a flow are control means for varying the flow area of said turbine inlet passage and actuable from a minimum flow area position when the engine is in said engine idle condition to a maximum flow area position, as the engine is accelerated from the engine idle condition, linkage means for operating said flow area control means and said wastegate valve, said linkage means including means rotatably mounted on said housing and means connecting said rotatably mounted means to each of said wastegate valve and said flow area control means, and rotation effecting means responsive to the pressure level in said compressor outlet passage and actuable from a retracted position when the pressure level in the compressor outlet passage is in low pressure condition during engine idle conditions through extended positions as the engine is accelerated from the engine idle condition and the pressure level in the compressor outlet passage increases from said low pressure condition, said rotation effecting means effecting rotation of said rotatably mounted means as a function of the pressure level in said compressor outlet passage, said rotatably mounted means including sequencing means for actuating said flow area control means from said minimum flow area position to said maximum flow area position while holding said wastegate valve closed and holding said flow area control means in said maximum flow area position while thereafter opening said wastegate valve.

9. An exhaust gas driven turbocharger as claimed in claim 8, wherein said rotation effecting means includes a pneumatic actuator communicated with the compressor outlet passage, said pneumatic actuator including an output member progressively actuated from a retracted to an extended position in response to successively increasing pressure levels in said compressor outlet passage, and linkage means connecting said output member to both said flow area control means and said wastegate valve.

10. An exhaust gas driven turbocharger as claimed in claim 8, wherein said housing includes a center housing supporting said shaft, a turbine housing mounted on one end of said center housing enclosing said turbine wheel, and a compressor housing mounted on the other end of said center housing and enclosing said compressor wheel, said rotatably mounted means being mounted between said turbine housing and said compressor housing.

11. An exhaust gas driven turbocharger for an engine capable of acceleration from an engine idle condition comprising a housing, a shaft rotatably mounted in said housing, a turbine wheel and a compressor wheel mounted in said housing on said shaft for rotation therewith, said housing defining a turbine inlet passage and a compressor inlet passage for communicating exhaust gas to said turbine wheel and ambient air to said compressor wheel respectively and further defining a turbine outlet passage and a compressor outlet passage for communicating exhaust gas and compressed air respectively from said housing, a wastegate valve for venting said turbine inlet passage, a flow are control means for varying the flow area of said turbine inlet passage and actuable from a minimum flow area position when the engine is in said engine idle condition to a maximum flow area position, as the engine is accelerated from the engine idle condition, and a single pneumatic actuator responsive to the pressure level in said compressor outlet passage and actuable from a retracted position when the pressure level in the compressor outlet passage is in a low pressure condition during engine idle conditions through extended positions as the engine is accelerated from the engine idle condition and the pressure level in the compressor outlet passage increases from said low pressure condition, said pneumatic actuator sequentially operating both said flow area control means and said wastegate valve, and linkage means connecting said pneumatic actuator to both said flow area control means and said wastegate valve, said linkage means including sequencing means for opening said flow area control means from said minimum flow area position to said maximum flow area position while holding said wastegate valve closed and holding said flow area control means in said maximum flow area position while opening said wastegate valve.

12. An exhaust gas driven turbocharger as claimed in claim 11, wherein said flow control means is a vane pivotally mounted in said turbine inlet passage, said linkage means including first interconnecting means for interconnecting the vane with an output member for pivoting the latter.

13. An exhaust gas driven turbocharger as claimed in claim 12, wherein said linkage means includes second interconnecting means for connecting the wastegate valve to said output member.

14. An exhaust gas driven turbocharger comprising a housing, a shaft rotatably mounted in said housing, a turbine wheel and a compressor wheel mounted in said housing on said shaft for rotation therewith, said housing defining a turbine inlet passage and a compressor inlet passage for communicating exhaust gas to said turbine wheel and ambient air to said compressor wheel respectively and further defining a turbine outlet passage and a compressor outlet passage for communicating exhaust gas and compressed air respectively from said housing, a wastegate valve for venting said turbine inlet passage, a flow area control means for varying the flow area of said turbine inlet passage and actuable from a minimum flow area position to a maximum flow area position, linkage means for operating said flow area control means and said wastegate valve, said linkage means including means rotatably mounted on said housing and means connecting said rotatably mounted means to each of said wastegate valve and said flow area control means, and rotation effecting means responsive to the pressure level in said compressor outlet passage for effecting rotation of said rotatably mounted means as a function of the pressure level in said compressor outlet passage, said rotatably mounted means including sequencing means for actuating said flow area control means from said minimum flow area position to said maximum flow area position while holding said wastegate valve closed and holding said flow area control means in said maximum flow area position while thereafter opening said wastegate valve, said sequencing means including a pair of members rotatable by said rotatably mounted means and connected respectively to the flow area control means and to the wastegate valve, and preloaded spring means acting between said members to urge the latter into predetermined positions relative to one another.

15. An exhaust gas driven turbocharger as claimed in claim 14, wherein said rotatably mounted means includes lever means for rotating the rotatably mounted means, said one member being connected to said flow area control means for actuation of the latter, said lever means including a pair of engaging portions for engaging the corresponding members respectively, said preloaded spring means maintaining said one member in engagement with one of said engaging portions as said rotatably mounted means is rotated to actuate the flow area control means.

16. An exhaust gas driven turbocharger as claimed in claim 15, wherein the other member is connected to said wastegate valve for actuation of the latter, said other member being engaged by said other engaging portion for actuation of the wastegate valve.

17. An exhaust gas driven turbocharger as claimed in claim 16, wherein said rotation effecting means includes a pneumatic actuator communicated with the compressor outlet passage, said pneumatic actuator including an output member progressively actuated from a retracted to an extended position in response to successively increasing pressure levels in said compressor outlet passage, said output member being connected to said lever means for actuation of the lever means to rotate the rotatably mounted means.

18. An exhaust gas driven turbocharger as claimed in claim 17, wherein said flow control means is a vane pivotally mounted in the turbine inlet passage.

* * * * *